(12) United States Patent
Su et al.

(10) Patent No.: US 12,140,852 B1
(45) Date of Patent: Nov. 12, 2024

(54) FLASHLIGHT AND ROTATING SHAFT ASSEMBLY

(71) Applicant: SHENZHEN NEEWER TECHNOLOGY CO. LTD, Shenzhen (CN)

(72) Inventors: Yuliang Su, Shenzhen (CN); Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 0 days.

(21) Appl. No.: 18/324,913

(22) Filed: May 26, 2023

(30) Foreign Application Priority Data

May 8, 2023 (CN) .......................... 202321087997.X (51) Int. Cl.
*G03B 15/05* (2021.01)
*F16M 11/10* (2006.01)

(52) U.S. Cl.
CPC .............. *G03B 15/05* (2013.01); *F16M 11/10* (2013.01); *F16M 11/105* (2013.01); *F16M 2200/024* (2013.01); *G03B 2215/0521* (2013.01)

(58) Field of Classification Search
CPC ............ G03B 15/05; G03B 2215/0521; F16M 11/10; F16M 11/105; F16M 2200/024
USPC ...................................... 362/3, 190
See application file for complete search history.

(56) References Cited

U.S. PATENT DOCUMENTS

| | | | |
|---|---|---|---|
| 2012/0037777 A1* | 2/2012 | Nagao ................... | F16M 11/10 248/292.12 |
| 2015/0036360 A1* | 2/2015 | Yamashita ............. | G03B 15/03 362/373 |
| 2019/0316768 A1* | 10/2019 | Saito ....................... | F21V 29/67 |

* cited by examiner

*Primary Examiner* — Laura K Tso
(74) *Attorney, Agent, or Firm* — Westbridge IP LLC (57) ABSTRACT

Disclosed are a flashlight and a rotating shaft assembly. The flashlight includes a rotating shaft assembly, a lamp head assembly and a control assembly. The rotating shaft assembly includes a rotating shaft body and a rotating member, the rotating member is rotatably provided on an end surface of the rotating shaft body, and the rotating member can rotate around a central axis of the rotating shaft body. The lamp head assembly is arranged in front of the rotating shaft assembly, the lamp head assembly is connected to the rotating member, and the lamp head assembly can rotate around the central axis of the rotating shaft body through the rotating member. The control assembly is arranged under the rotating shaft assembly and connected to a peripheral surface of the rotating shaft body.

13 Claims, 9 Drawing Sheets

FLASHLIGHT AND ROTATING SHAFT ASSEMBLY

CROSS-REFERENCE TO RELATED APPLICATIONS

This application claims priority to Chinese Patent Application No. 202321087997.X, filed on May 8, 2023, the entire contents of which are incorporated herein by reference.

TECHNICAL FIELD

The present disclosure relates to the technical field of lighting, and in particular to a flashlight and a rotating shaft assembly.

BACKGROUND

In the related art, a flashlight is usually provided on the mother seat of the camera to assist in shooting. The flashlight usually includes a control assembly and a lamp head assembly connected in sequence, and the end of the control assembly away from the lamp head assembly is connected to the mother seat of the camera. Since the control assembly and the lamp head assembly of the existing flashlights are often fixedly connected, the lighting angle of the lamp head assembly is narrow, which brings inconvenience.

SUMMARY

The main purpose of the present disclosure is to provide a flashlight, aiming to provide a flashlight with different lighting angles and improve the convenience of the flashlight and the rotating shaft assembly.

In order to achieve the above purpose, the present disclosure provides a flashlight, including: a rotating shaft assembly, a lamp head assembly and a control assembly.

The rotating shaft assembly includes a rotating shaft body and a rotating member, the rotating member is rotatably provided on an end surface of the rotating shaft body, and the rotating member can rotate around a central axis of the rotating shaft body;

the lamp head assembly is arranged in front of the rotating shaft assembly, the lamp head assembly is connected to the rotating member, and the lamp head assembly can rotate around the central axis of the rotating shaft body through the rotating member; and the control assembly is arranged under the rotating shaft assembly and connected to a peripheral surface of the rotating shaft body.

In an embodiment, the rotating member is provided with a first clamping structure, the first clamping structure can rotate with the rotating member, and the first clamping structure can be locked with the rotating shaft body to confine a rotational position of the rotating member.

In an embodiment, one end of the rotating shaft body facing the rotating member is provided with a plurality of first clamping slots, and the plurality of first clamping slots are arranged in sequence along a rotation path of the first clamping structure; and the first clamping structure is telescopic along a depth direction of the first clamping slot, and the first clamping structure can be plugged with any one of the first clamping slots.

In an embodiment, one end of the rotating shaft body facing the rotating member is formed with a limiting cavity, an end of the rotating member facing the rotating shaft assembly is rotatably arranged in the limiting cavity, the first clamping slot is arranged on an inner sidewall of the limiting cavity, and the plurality of first clamping slots are arranged in sequence around a circumferential direction of the limiting cavity; and the first clamping structure is arranged on a peripheral surface of the rotating member, and the first clamping structure is telescopic along a radial direction of the rotating member.

In an embodiment, a mounting slot is opened on the peripheral surface of the rotating member;

the first clamping structure is arranged in the mounting slot, and an end of the first clamping structure facing a bottom of the mounting slot is provided with an elastic member;

when the mounting slot is opposite to any one of the first clamping slots, the first clamping structure can extend to a notch of the mounting slot under a push from the elastic member, so that the first clamping structure is clamped with the first clamping slot; and when the rotating member rotates, the first clamping structure is pushed back into the mounting slot under a push from a wall of the limiting cavity.

In an embodiment, the control assembly is rotatably connected to the peripheral surface of the rotating shaft body, so that the shaft assembly can rotate relative to the control assembly around a vertical direction.

In an embodiment, a mounting wall is formed at one end of the control assembly facing the rotating shaft body, and a mounting hole is opened on the mounting wall; and a connecting structure protrudes from the side of the rotating shaft body facing the control assembly, and the connecting structure is plugged with the mounting hole, so that the control assembly is rotatably connected to the rotating shaft body.

In an embodiment, the connecting structure includes: a seat body, a connector clip, and a blocking member.

The seat body protrudes from the peripheral surface of the rotating shaft body, a connecting end surface is formed on the side of the seat body away from the rotating shaft body;

the connector clip protrudes from the connecting end surface, the connector clip is plugged into the mounting hole, and can rotate relative to the mounting hole; and the blocking member is arranged at the end of the connector clip away from the seat body, a cross-sectional area of the blocking member is larger than a cross-sectional area of the connector clip, and the blocking member can block one side of the mounting wall away from the rotating shaft body, so that the mounting wall is clamped between the blocking member and the seat body.

In an embodiment, a second clamping structure is provided on the side of the mounting wall away from the rotating shaft body, and the second clamping structure is adjacent to the blocking member to be clamped with the blocking member to limit a rotation position of the connection structure.

In an embodiment, a plurality of second clamping slots are formed on a peripheral surface of the blocking member, and the plurality of second clamping slots are sequentially arranged at intervals along a circumferential direction of the blocking member; and the second clamping structure is telescopic along a radial direction of the blocking member.

The present disclosure also provides a rotating shaft assembly, including: a rotating shaft body and a rotating member, the rotating member is rotatably provided on an end surface of the rotating shaft body, and the rotating member can rotate around a central axis of the rotating shaft body.

In an embodiment, the rotating member is provided with a first clamping structure, the first clamping structure can rotate following the rotating member, and the first clamping structure can be locked with the rotating shaft body to confine a rotational position of the rotating member.

In an embodiment, the end of the rotating shaft body facing the rotating member is provided with a plurality of first clamping slots, and the plurality of first clamping slots are arranged in sequence along a rotation path of the first clamping structure; and the first clamping structure is telescopic along a depth direction of the first clamping slot, and the first clamping structure can be plugged with any one of the first clamping slots.

In an embodiment, the end of the rotating shaft body facing the rotating member is formed with a limiting cavity, and the rotating member is a circle plate shape, the rotating member rotatably arranged in the limiting cavity, so that the inner circumferential sidewall of the limiting cavity is facing the peripheral surface of the rotating member.

the first clamping slot is arranged on the inner circumferential sidewall of the limiting cavity, and the plurality of first clamping slots are arranged in sequence around a circumferential direction of the limiting cavity; and the first clamping structure is arranged on a peripheral surface of the rotating member, and the first clamping structure is telescopic along a radial direction of the rotating member.

In an embodiment, a mounting slot is opened on the peripheral surface of the rotating member;

the first clamping structure is arranged in the mounting slot, and an end of the first clamping structure facing a bottom of the mounting slot is provided with an elastic member;

when the mounting slot is facing to any one of the first clamping slots, the first clamping structure is configured to extend to a notch of the mounting slot under a push from the elastic member, so that the head part of the first clamping structure is inserted into the first clamping slot; and when the rotating member rotates relatively to the rotating shaft body, the head part of the first clamping structure is pushed back into the mounting slot under a push from a wall of the limiting cavity.

In the technical solution of the present disclosure, the flashlight includes the rotating shaft assembly, the lamp head assembly and the control assembly. The rotating shaft assembly includes the rotating shaft body and the rotating member, and the rotating member is coaxial with the rotating shaft body and rotatably connected to the end of the rotating shaft body. The lamp head assembly is arranged in front of the rotating shaft body, fixedly connected to the rotating member, and is used for rotating and moving around the axis of the rotating shaft body with the rotating member. The control assembly is arranged under the rotating shaft assembly and is connected to the peripheral surface of the rotating shaft body. In this way, the rotating shaft assembly can rotate relatively to the control assembly, and the lamb head assembly can be driven to swing from left to right, so that the light emitting surface of the lamp head assembly can be illuminated in different directions, the lighting angle of the flashlight is increased and flashlight is more convenient to use.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the related art. Obviously, the drawings in the following description are only part of embodiments of the present disclosure. For those of ordinary skill in the art, other drawings can also be obtained according to the structures shown in these drawings without any creative effort.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there are directional indications, such as up, down, left, right, front, back, etc, involved in the embodiments of the present disclosure, the directional indications are only used to explain a certain posture as shown in the accompanying drawings. If the specific posture changes, the directional indication also changes accordingly.

In the description of the present disclosure, unless otherwise specified and limited, the terms "installation", "connecting" and "connection" should be understood in a broad sense, for example, it can be a fixed connection, a detachable connection, integrally connected, mechanically connected, electrically connected, directly connected or indirectly connected through an intermediary, and it can be the internal communication of two components. Those skilled in the art can understand the specific meanings of the above terms in the present disclosure according to specific situations.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this disclosure.

The present disclosure provides a flashlight 100.

Referring to FIG. 1 to FIG. 9, in an embodiment, the flashlight 100 includes a shaft assembly 10, a lamp head assembly 20, and a control assembly 30. The shaft assembly 10 includes a rotating shaft body 11 and a rotating member 12, the rotating member 12 is rotatably arranged on an end surface of the rotating shaft body 11 for rotating around a central axis A1 of the rotating shaft body 11. The lamp head assembly 20 is arranged in front of the rotating shaft assembly 10 and is connected to the rotating member 12, and the lamp head assembly 20 is used to rotate forward or reversely along M direction around the central axis A1 of the rotating shaft body 11 through the rotating member 12. The control assembly 30 is arranged under the rotating shaft assembly 10, and is connected to a peripheral surface of the rotating shaft body 11. In an embodiment, the lamp head assembly 20 is connected to a peripheral surface of the rotating shaft body 11, and the control assembly 30 is connected to the rotating member 12. In this way, the angle between the lamp head assembly 20 and the control assembly 30 can also be adjusted. When the control assembly 30 is fixed on other apparatus such as a camera, the lamp head assembly 20 can be adjusted to rotate around the central axis A1 in the direction of M, and the angle of the light emitted by the lamp head assembly 20 can be adjusted.

In this embodiment, the flashlight 100 includes the rotating shaft assembly 10, the lamp head assembly 20 and control assembly 30 connected in sequence. The lamp head assembly 20 is arranged in front of the rotating shaft assembly 10, a light emitting surface 21 of the lamp head assembly 20 is facing away from the rotating shaft assembly 10 to realize an illumination function of the flashlight 100. The control assembly 30 is arranged under the rotating shaft assembly 10, and an electric control panel is arranged in the control assembly 30 for controlling a lighting intensity and a lighting effect of the flashlight 100. Specifically, the rotating shaft assembly 10 includes the rotating shaft body 11 and the rotating member 12. The rotating member 12 is rotatably arranged on the end surface of the rotating shaft body 11, and can rotate around the central axis A1 of the rotating shaft body 11. The lamp head assembly 20 is provided with a mounting structure toward an end of the rotating shaft assembly 10 for connecting the rotating member 12, so that the lamp head assembly 20 can be fixed on the rotating member 12, and the lamp head assembly 20 can rotate synchronously with the rotating member 12. The control assembly 30 is connected to a peripheral surface of the rotating shaft body 11, an end of the control assembly 30 is provided with a clamping structure such as a shoe for connecting to the camera mother seat or other brackets, so that the flashlight 100 is detachably connected to the camera.

A relative rotation between the rotating member 12 and the rotating shaft body 11 may be driven by a driving member, or may be rotated manually. In an embodiment, a rotational movement between various components of the flashlight 100 can be realized manually, which can reduce a manufacturing cost of the flashlight 100 and is beneficial to reduce an overall volume of the flashlight 100.

Further, in some embodiments, the rotating shaft body 11, the rotating member 12 and a mounting structure of the lamp head assembly 20 are arranged in sequence and in layers along a direction of the central axis A1 of the rotating shaft body 11. Specifically, the rotating member 12 is confined at the end of the rotating shaft body 11. The mounting structure of the lamp head assembly 20 is covered on a side of the rotating member 12 away from the rotating shaft body 11, and is detachably connected to the rotating member 12. For example, the lamp head assembly 20 can be directly installed on rotating member 12 by screws. A positioning structure is provided at one side of the rotating member 12 away from the rotating shaft body 11. For example, a positioning block is protruded on the side of the rotating member 12 away from the rotating shaft body 11, a positioning hole is provided on one side of the lamp head assembly 20 facing the rotating member 12 or on the mounting structure of the lamp head assembly 20, and a quick positioning of the lamp head assembly 20 to the rotating member 12 can be realized through the positioning block and the positioning hole, which can increase a connection stability between the rotating member 12 and the lamp head assembly 20. Of course, the technical solution of the present disclosure is not limited thereto, the side of the rotating member 12 away from the rotating shaft body 11 may also be provided with a fool-proof structure, a guiding structure, etc., which are not limited here. In some embodiments, the lamp head assembly 20 can also be directly connected to the peripheral surface of the rotating member 12, and specific implementation methods can be set according to actual needs, which is not limited here.

The rotating shaft assembly 10 can be provided with the rotating member 12 and the rotating shaft body 11, one end of the rotating shaft body 11 is rotatably provided with a rotating member 12, the rotating member 12 is fixedly connected to the lamp head assembly 20, and another end of the rotating shaft body 11 is rotatably connected to the lamp head assembly 20. For example, but not limited to, the other end of the rotating shaft body 11 may be rotatably connected to the lamp head assembly 20 through the rotating shaft. The rotating shaft assembly 10 can also be provided with two rotating members 12 and the rotating shaft body 11, the two rotating members 12 are respectively arranged at two ends of the rotating shaft body 11, and the two rotating members 12 are rotatably cooperated with the lamp head assembly 20.

It should be noted that, in the related art, the flashlight 100 is usually arranged to assist shooting. However, in a common flashlight structure, the control assembly 30 is fixedly connected to the lamp head assembly 20, thus a lighting angle of the flashlight 100 is single, which limits the use of the flashlight 100.

Therefore, it can be understood that, in the technical solution of the present disclosure, the flashlight 100 includes the rotating shaft assembly 10, the lamp head assembly 20 and the control assembly 30. The rotating shaft assembly 10 includes the rotating shaft body 11 and the rotating member 12, and the rotating member 12 is coaxially arranged and rotatably connected to the rotating shaft body 11. The lamp head assembly 20 is arranged in front of the rotating shaft body 11, fixedly connected to the rotating member 12, and is used to rotate forward or reversely along a M direction around the central axis A1 of the rotating shaft body 11 with the rotating member 12. The control assembly 30 is arranged under the rotating shaft assembly 10, and is connected to a peripheral surface of the rotating shaft body 11. In this way, the rotating shaft assembly 10 can be rotated relative to the control assembly 30 to drive the lamp head assembly 20 to swing along the M direction to adjust a pitch angle, so that the light emitting surface of the lamp head assembly 20 can be illuminated in different directions, which increases an angle range of the flashlight 100 and improves the convenience of using the flashlight 100.

Referring to FIG. 1 to FIG. 5, in some embodiments, the rotating member 12 is provided with a first clamping structure 13. The first clamping structure 13 is used to rotate and move following with the rotating member 12, and can be clamped with the rotating shaft body 11 to define a rotational position of the rotating member 12. The first clamping structure 13 can be one or more.

In this embodiment, the rotating member 12 is provided with a first clamping structure 13 facing the rotating shaft body 11, and the first clamping structure 13 is used to rotate and move with the rotating member 12. After the first clamping structure 13 rotates to a preset position to be clamped with the rotating shaft body 11, the rotational position of the rotating member 12 can be defined. The first clamping structure 13 may be, but not limited to, arranged on the peripheral surface of the rotating member 12 adjacent to the rotating shaft body 11, or may be, but not limited to, arranged on the end surface of the rotating member 12 facing the rotating shaft body 11. In this way, while the rotating shaft assembly 10 is rotatably connected to the lamp head assembly 20, the lamp head assembly 20 also has a self-locking function, thereby preventing the lamp head assembly 20 from rotating or excessively displacing after it rotates to a desired angle, which can improve the convenience of the flashlight 100.

Figure 1:
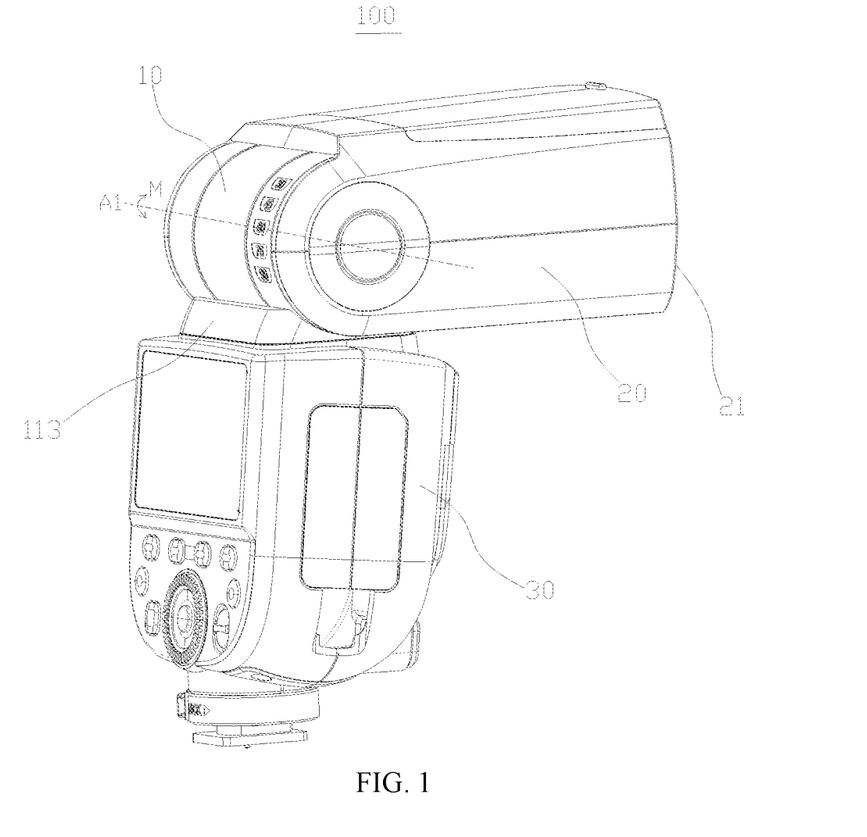
FIG. 1 is a structural view of a flashlight according an embodiment of the present disclosure.
Figure 2:
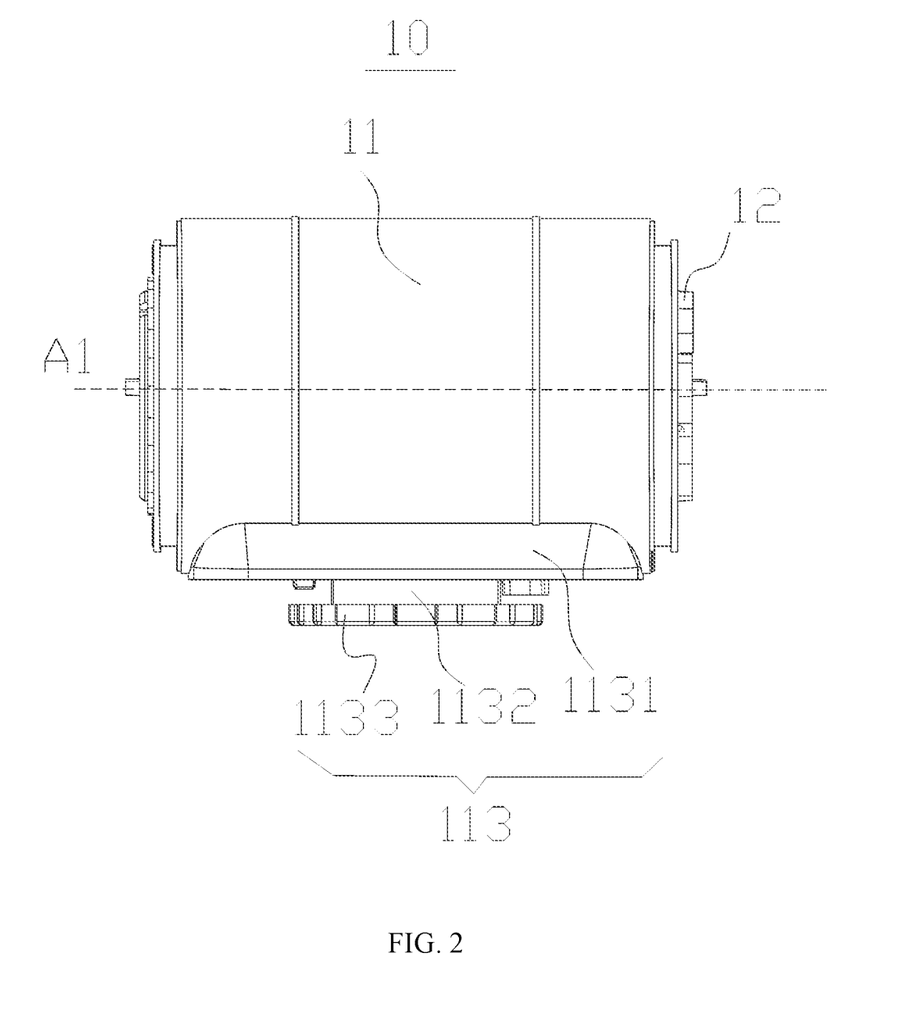
FIG. 2 is a structural view of a shaft assembly of the flashlight in FIG. 1.
Figure 3:
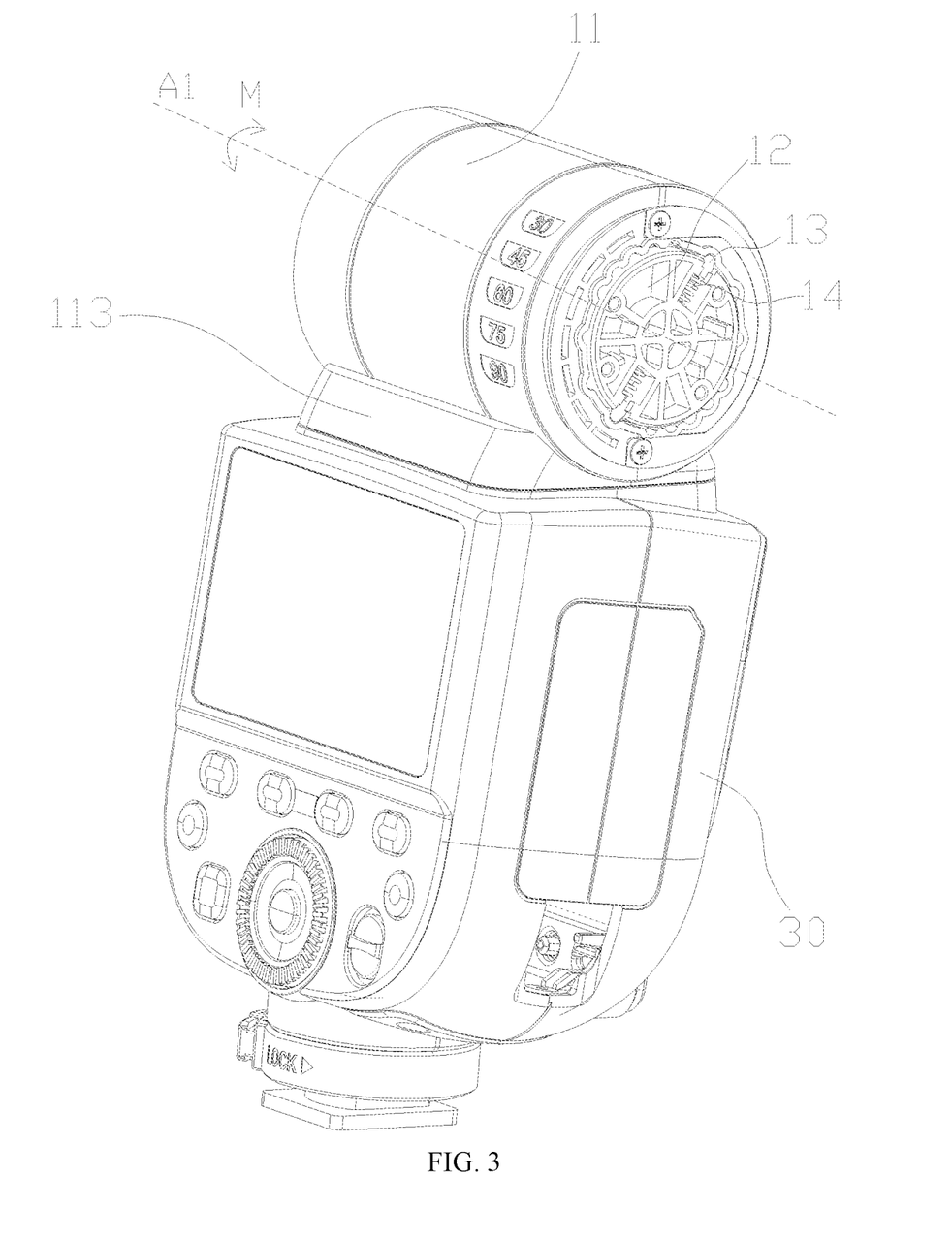
FIG. 3 is a structural view of a first part of the flashlight in FIG. 1.
Figure 4:
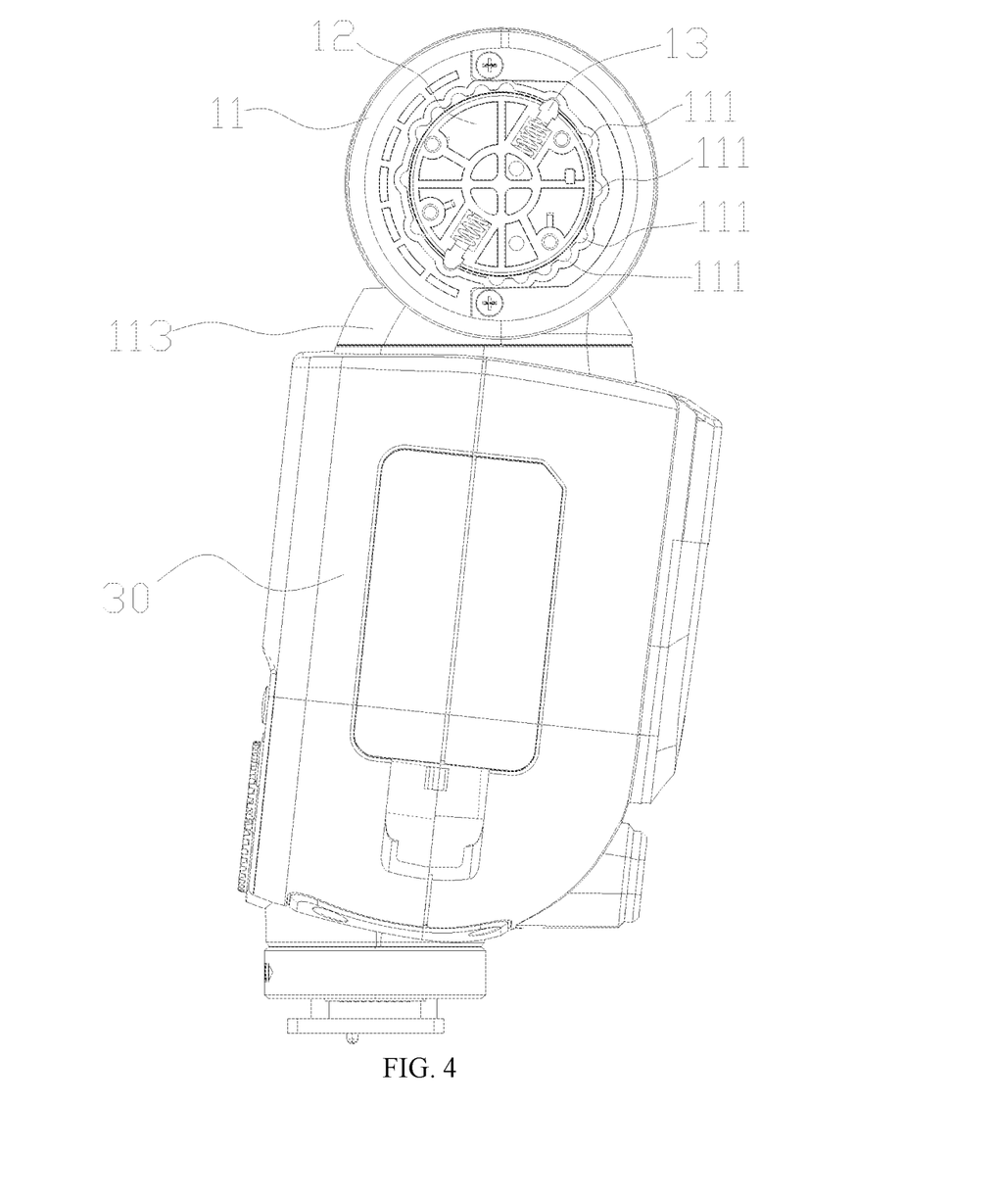
FIG. 4 is a side view of the first part of the flashlight in FIG. 3.

Referring to FIG. 2 to FIG. 4, in some embodiments, the rotating shaft body 11 is provided with a plurality of first clamping slots 111 facing the rotating member 12, and the plurality of first clamping slot 111 are arranged in sequence along a rotation path of a first clamping structure 13. The first clamping structure 13 is telescopic along a depth direction of the first clamping slot 111, and is used to be plugged with the first clamping slot 111.

In this embodiment, the end of the rotating shaft body 11 facing the rotating member 12 is provided with a plurality of first clamping slots 111, and the plurality of first clamping slots 111 are arranged in sequence along the rotation path of the first clamping structure 13. The first clamping slot 111 is opposite to the first clamping structure 13, the first clamping structure 13 can be extended along the depth direction of the first clamping slot 111 to be in an extended state or a retracted state. In some embodiments, an end surface of the rotating shaft body 11 is provided with a circular concave hole, the rotating member 12 is a disk fitted with the concave hole, and the rotating member 12 is installed in the concave hole, so that the sidewall of the rotating member 12 is opposite to the sidewall of the concave hole. The first clamping slot 111 can be arranged in a row on the sidewall of the concave hole, and the first clamping structure 13 is telescopically installed on the rotating member 12 and the first clamping structure 13 is opposite to the concave hole. When the first clamping structure 13 is in the retracted state, the rotating shaft body 11 can move relative to the rotating member 12. When in the extended state, the first clamping structure 13 can extend into one of the first clamping slots 111, so that the rotating member 12 is clamped with the rotating shaft body 11, and the rotating member 12 can be confined to a preset rotating position. A certain force is applied to make the lamp head assembly 20 rotate along the M direction, so as to overcome a friction between walls of the first clamping slot and make the rotating member 12 rotate, so that the first clamping structure 13 switches among different first clamping slots 111. After the force is released, the lamp head assembly 20 can maintain the relative position with the rotating assembly without skidding.

Further, in some embodiments, the first clamping structure 13 is arranged to imitate a shape of the first clamping slot 111 so as to form a good fit with the first clamping slot 111. The outer wall of the first clamping structure 13 is also formed with a smooth guiding surface, which facilitates the first clamping structure 13 to smoothly slip out of the first clamping slot 111 under an external force, so as to avoid a jamming or a collision damage between components.

Figure 5:
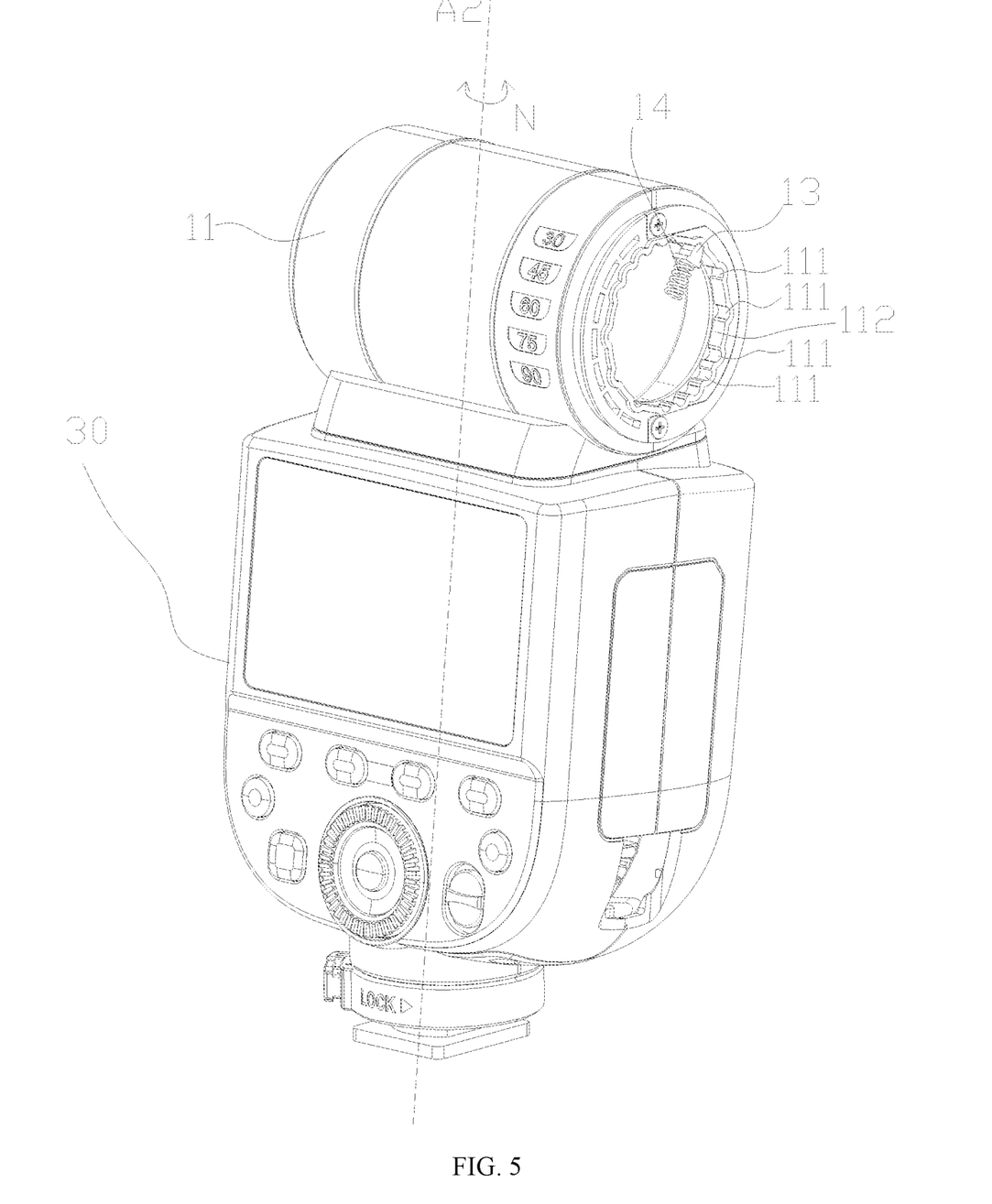
FIG. 5 is a structural view of a second part of the flashlight in FIG. 1.

Referring to FIG. 5, in some embodiments, the end of the rotating shaft body 11 facing the rotating member 12 formed with a limiting cavity 112, and the end of the rotating member 12 facing the rotating shaft assembly 10 can be rotatably arranged in the limiting cavity 112, so that the sidewall of the rotating member 12 is opposite to the inner side wall of the limiting cavity 112. The first clamping slot 111 is arranged in sequence around the circumferential direction of the limiting cavity 112. The end of the first clamping structure 13 arranged on a peripheral surface of the rotating member 12 is in a shape of a rod or a boss that can extend into or out of the first clamping slot 111, and is telescopic along the radial direction of the rotating member 12.

In this embodiment, the end of the rotating shaft body 11 facing the rotating member 12 is formed with the limiting cavity 112, and the limiting cavity 112 is throughly arranged toward an end of the rotating member 12. The end of the rotating member 12 facing the rotating shaft assembly 10 is rotatably accommodated in the limiting cavity 112. Specifically, the limiting cavity 112 is a circular cross section, the side of the rotating member 12 facing the shaft assembly 10 is formed with a circular truncated structure, the circular truncated structure is accommodated in the limiting cavity 112, and an outer wall of the circular truncated structure is slidably connected to a wall of the limiting cavity 112. In this way, the wall of the limiting cavity 112 can confine the rotating member 12 in the axial direction, which can improve the positional stability between the rotating member 12 and the rotating shaft body 11. The first clamping slot 111 can be arranged on a bottom wall of the limiting cavity 112 or the end surface of the rotating shaft body 11 formed with the limiting cavity 112. When rotating with the rotating member 12 to a position facing the first clamping slot 111, the first clamping structure 13 can be telescopic along the axial direction of the rotating shaft assembly 10. The first clamping slot 111 can also be provided on the inner sidewall of the limiting cavity 112 in the following embodiments, so that the first clamping structure 13 can be telescopic along a radial direction of the rotating assembly.

Figure 6:
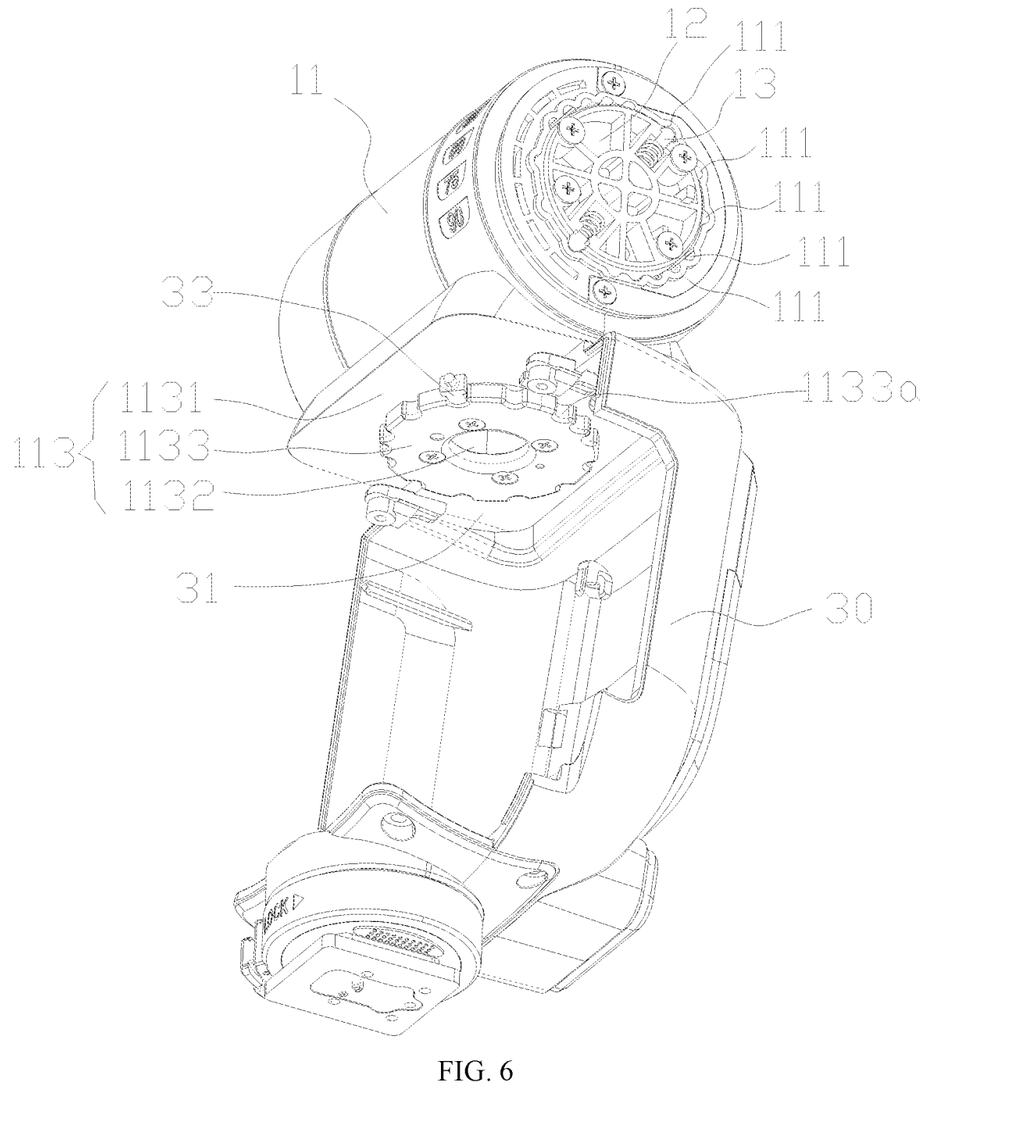
FIG. 6 is an internal structural view of the second part of the flashlight in FIG. 5.

In an embodiment, referring to FIG. 5 the first clamping slot 111 is arranged on the inner side wall of the limiting cavity 112, a plurality of first clamping slots 111 are arranged in sequence around the circumferential direction of the limiting cavity 112, the depth of the first clamping slot 111 is extended along the radial direction of the rotating member 12, and a notch of each first clamping slot 111 is connected to the limiting cavity 112. Referring to FIG. 6, the first clamping structure 13 is arranged on the peripheral surface of the rotating member 12 and opposite to the first clamping slot 111, and is telescopic along a radial direction of the rotating member 12, which prevents the first clamping structure 13 from exerting an axial force on the rotating member 12 during the telescopic movement, thereby facilitating a cooperation in the axial direction of the rotating member 12 and the rotating shaft body 11, and improving the structural stability of a shaft coupling assembly.

Figure 9:
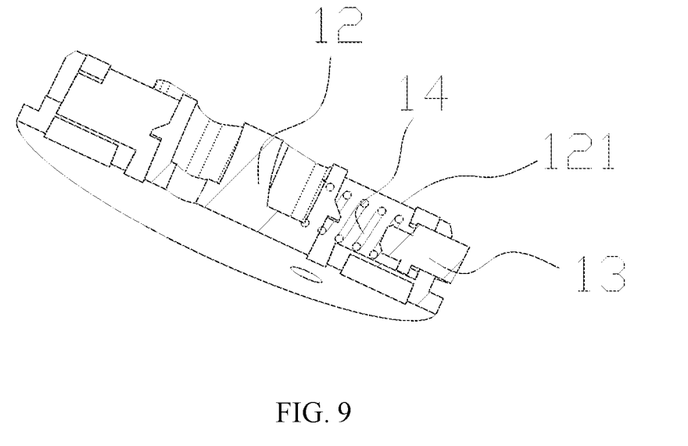
FIG. 9 is a cross-sectional view of the rotating member of the flashlight in FIG. 8.

Referring to FIG. 9, in some embodiments, a mounting slot 121 is opened on the peripheral surface of the rotating member 12, the first clamping structure 13 is arranged in the mounting slot 121, and an elastic member 14 is provided at an end of the first clamping structure 13 toward a slot bottom of the mounting slot 121. When the mounting slot 121 is opposite to any one first clamping slot 111, the end of the first clamping structure 13 can extend and enter the notch of the mounting slot under a push from the elastic member 14. When the rotating member 12 rotates, the first clamping structure 13 can be pushed back into the mounting slot 121 by the wall of the limiting cavity 112.

In this embodiment, the mounting slot 121 is provided on the peripheral surface of the rotating member 12, the mounting slot 121 extends radially along the rotating member 12, and the notch of the mounting slot 121 is communicated with the limiting cavity 112. The first clamping structure 13 is slidably installed in the mounting slot 121, and the elastic member 14 is arranged at one end of the first clamping structure 13 toward the bottom of the mounting slot 121. In an embodiment, the user can move the lamp head assembly 20 along the M direction, and the mounting slot 121 can rotate following with the rotating member 12 relative to the limiting cavity 112. When the notch of the mounting slot 121 is turned to be opposite to the wall of the limiting cavity 112, the first clamping structure 13 can be pushed back into the mounting slot 121 by the wall of the limiting cavity 112, and the elastic member 14 is compressed and contracted to accumulate an elastic potential energy. When the notch of the mounting slot 121 is rotated to be opposite to the notch of any one of the first clamping slot 111, the elastic member 14 can release the elastic potential energy, so that the head of the first clamping structure 13 can be pushed to extend out of the mounting slot 121 by the elastic member 14 and insert into the first clamping slot 111. When no longer moved, the lamp head assembly 20 can maintain a relative position with the rotating assembly without slipping. The mounting slot 121 can also play a confining role on the first clamping structure 13 to improve the positional stability of the first clamping structure 13.

Referring to FIG. 1 to FIG. 9, in some embodiments, the control assembly 30 is rotatably connected to the peripheral surface of the rotating shaft body 11, so that the shaft assembly 10 can rotate forward or reversely relative to the control assembly 30 around N direction of a vertical axis A2.

Referring to FIG. 5 In this embodiment, the control assembly 30 and the rotating shaft body 11 are connected in sequence along the vertical direction, and the control assembly 30 is rotatably connected to the peripheral surface of the rotating shaft body 11, so that each component of the rotating shaft assembly 10 including the lamp head assembly 20 connected to the rotating assembly can be driven by the rotating shaft body 11 to rotate relative to the control assembly 30 around the N direction of the vertical axis A2, and the lamp head assembly 20 is driven to rotate around the vertical direction. In this way, the lighting angle of the lamp head assembly 20 can be increased, and the convenience of the flashlight 100 is improved.

The relative rotation between the control assembly 30 and the rotating shaft body 11 can be driven by the driving member, or can be rotated manually. In an embodiment, the rotational movement between the components of the flashlight 100 can be realized manually, which can reduce the manufacturing cost of the flashlight 100 and is beneficial to reduce the overall volume of the flashlight 100.

Figure 7:
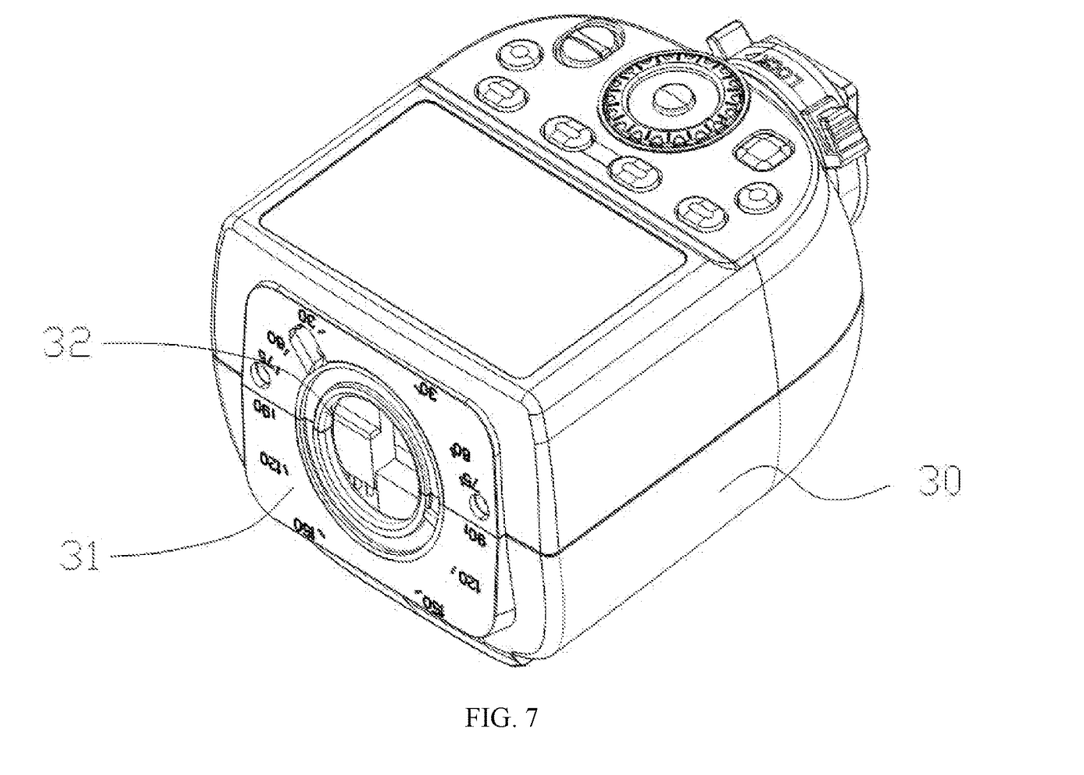
FIG. 7 is a structural view of a control assembly of the flashlight in FIG. 1.
Figure 8:
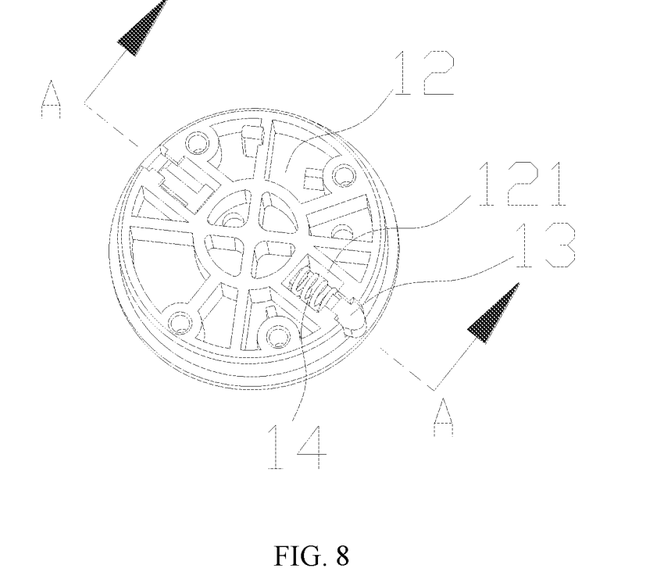
FIG. 8 is a structural view of a rotating member of the flashlight in FIG. 1.

Referring to FIG. 6 and FIG. 7, in some embodiments, a mounting wall 31 is formed on an end of the control assembly 30 facing the rotating shaft body 11, and a mounting hole 32 is opened on the mounting wall 31. A connecting structure 113 protrudes from one side of the rotating shaft body 11 facing the control assembly 30, the connecting structure 113 is plugged to the mounting hole 32, and the center axial of the mounting hole 32 is perpendicular to the axial A1 of the rotating shaft body 11, for making the control assembly 30 rotatably connected to the rotating shaft body 11.

In this embodiment, the mounting wall 31 is formed on the end of the control assembly 30 facing the rotating shaft body 11, the mounting hole 32 is opened on the mounting wall 31, and the mounting hole 32 is arranged cutting through two sides of the mounting wall 31. The connecting structure 113 protrudes from one side of the rotating shaft body 11 facing the control assembly 30, the connecting structure 113 is plugged to the mounting hole 32 for making the control assembly 30 rotatably connected to the rotating shaft body 11 around the center axial of the mounting hole 32.

Specifically, in some embodiments, the control assembly 30 includes a casing and a control element. An accommodating space is formed in the casing, the mounting wall 31 is formed at the end of the casing facing the rotating shaft body 11, and the mounting hole 32 on the mounting wall 31 is connected to an external environment and the accommodation space. Of course, the technical solution of the present disclosure is not limited thereto. In some embodiments, a board structure may also be erected at one end of the casing facing the rotating shaft body 11, the board structure includes the mounting wall 31. It may also be other mounting structures on the casing capable of forming the mounting wall 31, which is not limited here.

Referring to FIG. 2 to FIG. 7, in some embodiments, the connecting structure 113 includes a seat body 1131, a connector clip 1132 and a blocking member 1133, the seat body 1131 protrudes from the peripheral surface of the rotating shaft body 11, a connecting end surface is formed at one side of the seat body 1131 away from the rotating shaft body 11. The connector clip 1132 protrudes from the connecting end surface to be inserted into the mounting hole 32, and can rotate relative to the mounting hole 32. The blocking member 1133 is provided at the end of the connector clip 1132 away from the seat body 1131, and a cross-sectional area of the blocking member 1133 is larger than that of the connector clip 1132, which is used to block the side of the mounting wall 31 away from the rotating shaft body 11, so that the mounting wall 31 is clamped between the blocking member 1133 and the seat body 1131.

In this embodiment, the connection structure 113 includes the seat body 1131, the connector clip 1132, and the blocking member 1133. The seat body 1131 protrudes from the peripheral surface of the rotating shaft body 11, and the connecting end surface is formed on the side of the seat body 1131 away from the rotating shaft body 11. The connector 1132 protrudes from the connecting end surface and has a columnar structure. The connector 1132 is used to be inserted in the mounting hole 32 and can rotate relative to the mounting hole 32, so that the rotating shaft body 11 can rotate relative to the control assembly 30. The blocking member 1133 is arranged at the end of the connector clip 1132 away from the seat body 1131, and the cross-sectional area of the blocking member 1133 is larger than that of the connector clip 1132, which is used to block the side of the mounting wall 31 away from the rotating shaft body 11, so that the mounting wall 31 is clamped between the blocking member 1133 and the seat body 1131. In this way, the positional stability between the connection structure 113 and the mounting wall 31 is increased.

In some embodiments, the connector clip 1132 can be hollowed, so as to achieve a certain weight reduction effect and facilitate wiring, that is, the wire used to connect the lamp head assembly 20 and the control assembly 30 can pass through the hollowed structure in the connector clip 1132, which makes the lamp head assembly 20 electrically connected to the control assembly 30, so as to realize the control of the lamp head assembly 20 by the control assembly 30. The wire is long enough and a swing length is reserved for being arranged at the hollowed structure in the connector clip 1132, which will not affect the rotation.

Referring to FIG. 6, in some embodiments, a second clamping structure 33 is provided on the side of the mounting wall 31 away from the rotating shaft body 11, and the second clamping structure 33 is adjacent to the blocking member 1133 to be clamped with the blocking member 1133, so as to confine the rotation position of the connecting structure 113.

In this embodiment, the second clamping structure 33 is provided on the side of the mounting wall 31 away from the rotating shaft body 11, and the second clamping structure 33 is adjacent to the blocking member 1133 to be clamped with the blocking member 1133, so as to confine the rotation position of the connecting structure 113. The second clamping structure 33 can be one or more. In this way, while realizing the rotational connection between the rotating shaft assembly 10 and the control assembly 30, the control assembly 30 can also have a self-locking function, so as to prevent the rotating shaft assembly 10 from reversely turning or the excessive displacement after the rotating shaft assembly 10 rotates to the desired angle relative to the control assembly 30. In this way, the convenience of the flashlight 100 can be improved.

Referring to FIG. 6, in some embodiments, the blocking member 1133 is circular, a second clamping slot 1133a is opened on the peripheral surface of the blocking member 1133, and a plurality of second clamping slots 1133a are sequentially arranged at intervals along the circumferential sidewall of the blocking member 1133. The second clamping structure 33 is telescopic long the radial direction of the blocking member 1133.

In this embodiment, the second clamping slot 1133a is opened on the peripheral surface of the blocking member 1133, the second clamping slot 1133a extends radially along the blocking member 1133, and the plurality of second clamping slots 1133a are sequentially arranged at intervals along the circumferential direction of the blocking member 1133. The second clamping structure 33 is telescopic along the radial direction of the blocking member 1133, and has an extended state and a retracted state. When the second clamping structure 33 is in the retracted state, the blocking member 1133 can rotate relative to the mounting wall 31. When in the extended state, the second clamping structure 33 can extend into one of the second locking slots 1133a, so that the blocking member 1133 is clamped with the mounting wall 31, and the blocking member 1133 can be confined to the preset rotation position.

The second clamping structure 33 is arranged to imitate a shape of the second clamping slot 1133a to form a good fit with the second clamping slot 1133a. The outer wall of the second clamping structure 33 is also formed with a smooth guiding surface, which facilitates the second clamping structure 33 to smoothly slip out of the second clamping slot 1133a under an external force, so as to avoid the jamming or the collision damage between components.

Further, in some embodiments, a confining groove is provided on the side of the mounting wall 31 away from the rotating shaft body 11, and the second clamping structure 33 is slidably installed in the confining groove for confining the second clamping structure 33. Specifically, the confining groove is directly opposite to the peripheral side of the blocking member 1133, and extends along the radial direction of the blocking member 1133. The second clamping structure 33 is arranged in the confining groove, and the second clamping structure 33 is elastically connected to a bottom of the confining groove. In this way, during use, when the lamp head assembly 20 is rotated along the N direction by the external force, the blocking member 1133 can rotate synchronously along the N direction. The second clamping structure 33 can be pushed back to the confining groove by the peripheral surface of the blocking member 1133, and the spring can be compressed and contracted to store the elastic potential energy. When the lamp head assembly 20 continues to rotate along the N direction so that the notch of the confining groove is facing the notch of any one of the second clamping slot 1133a, the spring can release the elastic potential energy, the second clamping structure 33 can protrude under the push of the spring and the end of the second clamping structure 33 can be inserted into the notch of the confining groove, so as to clamped with the blocking member 1133. The confining groove can also play a role of confining the second clamping structure 33 to improve the positional stability of the second clamping structure 33.

It should be noted that, when the mounting wall 31 is a thick-walled member, the confining groove can be directly provided on a side surface of the mounting wall 31 away from the rotating shaft body 11. When the mounting wall 31 is a thin-walled member, a protrusion can be provided on the side surface of the mounting wall 31 away from the rotating shaft body 11, and the confining groove is provided on the protrusion. In this way, the structural strength of the mounting wall 31 is ensured. The specific implementation manner can be set according to actual needs, and is not limited here.

The present disclosure also provides a rotating shaft assembly 10, including: a rotating shaft body 11 and a rotating member 12, the rotating member 12 is rotatably provided on an end surface of the rotating shaft body 11, and the rotating member 12 can rotate around a central axis of the rotating shaft body 11

In an embodiment, the rotating member 12 is provided with a first clamping structure 13, the first clamping structure 13 is configured to rotate following the rotating member 12, and the first clamping structure 13 can be locked with the rotating shaft body 11 to confine a rotational position of the rotating member 12.

In an embodiment, the end of the rotating shaft body 11 facing the rotating member 12 is provided with a plurality of first clamping slots 111, and the plurality of first clamping slots 111 are arranged in sequence along a rotation path of the first clamping structure 13; and the first clamping structure 13 is telescopic along a depth direction of the first clamping slot 111, and the first clamping structure 13 can be plugged with any one of the first clamping slots 111.

In an embodiment, the end of the rotating shaft body 11 facing the rotating member 12 is formed with a limiting cavity 112, and the rotating member 12 is a circle plate shape, the rotating member 12 rotatably arranged in the limiting cavity 112, so that the inner circumferential sidewall of the limiting cavity 112 is facing the peripheral surface of the rotating member the first clamping slot 111 is arranged on the inner circumferential sidewall of the limiting cavity 112, and the plurality of first clamping slots 111 are arranged in sequence around a circumferential direction of the limiting cavity 112; and the first clamping structure 13 is arranged on a peripheral surface of the rotating member 12, and the first clamping structure 13 is telescopic along a radial direction of the rotating member 12.

In an embodiment, a mounting slot 121 is opened on the peripheral surface of the rotating member 12; the first clamping structure 13 is arranged in the mounting slot 121, and an end of the first clamping structure 13 facing a bottom of the mounting slot 121 is provided with an elastic member, such as spring. When the mounting slot 121 is facing to any one of the first clamping slots 111, the first clamping structure 13 can extend to a notch of the mounting slot 111 under a push from the elastic member, so that the head part of the first clamping structure 13 is inserted into the first clamping slot 111; and when the rotating member 12 rotates relatively to the rotating shaft body 11, the head part of the first clamping structure 13 is pushed back into the mounting slot 121 under a push from a wall of the limiting cavity 112.

It should be noted that not only can the rotating shaft assembly be applied to connect the lamp head assembly 20 and the control assembly 30 to adjust the angle. In other embodiments, the rotating shaft assembly can also be applied to any other parts that need to be connected and the angle between which needs to be adjusted, which is not limited here.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields are included in the scope of the present disclosure.

What is claimed is:

1. A flashlight, comprising:
a rotating shaft assembly, wherein the rotating shaft assembly comprises a rotating shaft body and a rotating member, the rotating member is rotatably provided on an end surface of the rotating shaft body, and the rotating member is configured to rotate around a central axis of the rotating shaft body;
a lamp head assembly arranged in front of the rotating shaft assembly, wherein the lamp head assembly is connected to the rotating member, and the lamp head assembly is configured to rotate around the central axis of the rotating shaft body through the rotating member; and
a control assembly, wherein the control assembly is arranged under the rotating shaft assembly and connected to a peripheral surface of the rotating shaft body, and wherein the rotating member is provided with a first clamping structure, the first clamping structure is configured to rotate following the rotating member, and the first clamping structure is configured to be locked with the rotating shaft body to confine a rotational position of the rotating member.

2. The flashlight of claim 1, wherein:
one end of the rotating shaft body facing the rotating member is provided with a plurality of first clamping slots, and the plurality of first clamping slots are arranged in sequence along a rotation path of the first clamping structure; and
the first clamping structure is telescopic along a depth direction of the first clamping slot, and the first clamping structure is configured to be plugged with any one of the first clamping slots.

3. The flashlight of claim 2, wherein:
one end of the rotating shaft body facing the rotating member is formed with a limiting cavity, an end of the rotating member facing the rotating shaft assembly is rotatably arranged in the limiting cavity, the first clamping slot is arranged on an inner sidewall of the limiting cavity, and the plurality of first clamping slots are arranged in sequence around a circumferential direction of the limiting cavity; and
the first clamping structure is arranged on a peripheral surface of the rotating member, and the first clamping structure is telescopic along a radial direction of the rotating member.

4. The flashlight of claim 3, wherein:
a mounting slot is opened on the peripheral surface of the rotating member;
the first clamping structure is arranged in the mounting slot, and an end of the first clamping structure facing a bottom of the mounting slot is provided with an elastic member;
when the mounting slot is opposite to any one of the first clamping slots, the first clamping structure is configured to extend to a notch of the mounting slot under a push from the elastic member, so that the first clamping structure is clamped with the first clamping slot; and
when the rotating member rotates, the first clamping structure is pushed back into the mounting slot under a push from a wall of the limiting cavity.

5. The flashlight of claim 1, wherein the control assembly is rotatably connected to the peripheral surface of the rotating shaft body, so that the rotating shaft assembly is configured to rotate relative to the control assembly around a direction vertical to an upper surface of the control assembly facing the peripheral surface of the rotating shaft body.

6. The flashlight of claim 5, wherein:
a mounting wall is formed at one end of the control assembly facing the rotating shaft body, and a mounting hole is opened on the mounting wall; and
a connecting structure protrudes from the side of the rotating shaft body facing the control assembly, and the connecting structure is plugged with the mounting hole, so that the control assembly is rotatably connected to the rotating shaft body.

7. The flashlight of claim 6, wherein the connecting structure comprises:
a seat body protruding from the peripheral surface of the rotating shaft body, wherein a connecting end surface is formed on the side of the seat body away from the rotating shaft body;
a connector clip protruding from the connecting end surface, wherein the connector clip is plugged into the mounting hole, and is configured to rotate relative to the mounting hole; and
a blocking member arranged at the end of the connector clip away from the seat body, wherein a cross-sectional area of the blocking member is larger than a cross-sectional area of the connector clip, and the blocking member is configured to block one side of the mounting wall away from the rotating shaft body, so that the mounting wall is clamped between the blocking member and the seat body.

8. The flashlight of claim 7, wherein a second clamping structure is provided on the side of the mounting wall away from the rotating shaft body, and the second clamping structure is adjacent to the blocking member to be clamped with the blocking member to limit a rotation position of the connection structure.

9. The flashlight of claim 8, wherein:
a plurality of second clamping slots are formed on a peripheral surface of the blocking member, and the plurality of second clamping slots are sequentially arranged at intervals along a circumferential direction of the blocking member; and
the second clamping structure is telescopic along a radial direction of the blocking member.

10. A rotating shaft assembly, comprising:
a rotating shaft body and a rotating member, wherein the rotating member is rotatably provided on an end surface of the rotating shaft body, the rotating member is configured to rotate around a central axis of the rotating shaft body, and the rotating member is provided with a first clamping structure, the first clamping structure is configured to rotate following the rotating member, and the first clamping structure is configured to be locked with the rotating shaft body to confine a rotational position of the rotating member.

11. The rotating shaft assembly of claim 10, wherein:
the end of the rotating shaft body facing the rotating member is provided with a plurality of first clamping slots, and the plurality of first clamping slots are arranged in sequence along a rotation path of the first clamping structure; and
the first clamping structure is telescopic along a depth direction of the first clamping slot, and the first clamping structure is configured to be plugged with any one of the first clamping slots.

12. The rotating shaft assembly of claim 11, wherein:
the end of the rotating shaft body facing the rotating member is formed with a limiting cavity, and the rotating member is a circle plate shape, the rotating member rotatably arranged in the limiting cavity, so that the inner circumferential sidewall of the limiting cavity is facing the peripheral surface of the rotating member;
the first clamping slot is arranged on the inner circumferential sidewall of the limiting cavity, and the plurality of first clamping slots are arranged in sequence around a circumferential direction of the limiting cavity; and
the first clamping structure is arranged on a peripheral surface of the rotating member, and the first clamping structure is telescopic along a radial direction of the rotating member.

13. The rotating shaft assembly of claim 12, wherein:
a mounting slot is opened on the peripheral surface of the rotating member;
the first clamping structure is arranged in the mounting slot, and an end of the first clamping structure facing a bottom of the mounting slot is provided with an elastic member;
when the mounting slot is facing to any one of the first clamping slots, the first clamping structure is configured to extend to a notch of the mounting slot under a push from the elastic member, so that the head part of the first clamping structure is inserted into the first clamping slot; and
when the rotating member rotates relatively to the rotating shaft body, the head part of the first clamping structure is pushed back into the mounting slot under a push from a wall of the limiting cavity.

* * * * *